United States Patent [19]

Shaffer

[11] 4,087,233
[45] May 2, 1978

[54] RADIATION SWITCH FOR PHOTOFLASH UNIT

[75] Inventor: John W. Shaffer, Williamsport, Pa.

[73] Assignee: GTE Sylvania Incorporated, Stamford, Conn.

[21] Appl. No.: 733,599

[22] Filed: Oct. 18, 1976

[51] Int. Cl.² ............................................. F21K 5/02
[52] U.S. Cl. .............................. 431/95 A; 252/518; 362/6; 362/13
[58] Field of Search ............... 431/95, 95 A; 240/1.3; 252/518

[56] References Cited

U.S. PATENT DOCUMENTS

| | | | |
|---|---|---|---|
| 3,459,488 | 8/1969 | Schroder et al. | 431/95 |
| 3,951,582 | 4/1976 | Holub et al. | 431/95 A |
| 3,990,832 | 11/1976 | Smialek et al. | 431/95 A |
| 3,990,833 | 11/1976 | Holub et al. | 431/95 A |

Primary Examiner—Carroll B. Dority, Jr.
Attorney, Agent, or Firm—Edward J. Coleman

[57] ABSTRACT

A photoflash unit having a plurality of high voltage type flashlamps mounted in a planar array on a printed circuit board containing circuitry for sequentially igniting the flash lamps in response to successive high voltage firing pulses applied thereto. The circuitry includes a plurality of solid state switches capable of being easily activated by radiant energy generated during flashing of the lamps. Initially, the switches have a high resistance, and after being activated by radiation, they undergo chemical conversion to a conductive state. The switches are prepared from compositions particularly resistant to high relative humidity and above normal ambient temperatures. The switch material composition comprises silver carbonate, a binder such as polystyrene resin, and an oxidizer such as barium chromate.

8 Claims, 7 Drawing Figures

U.S. Patent  May 2, 1978  4,087,233
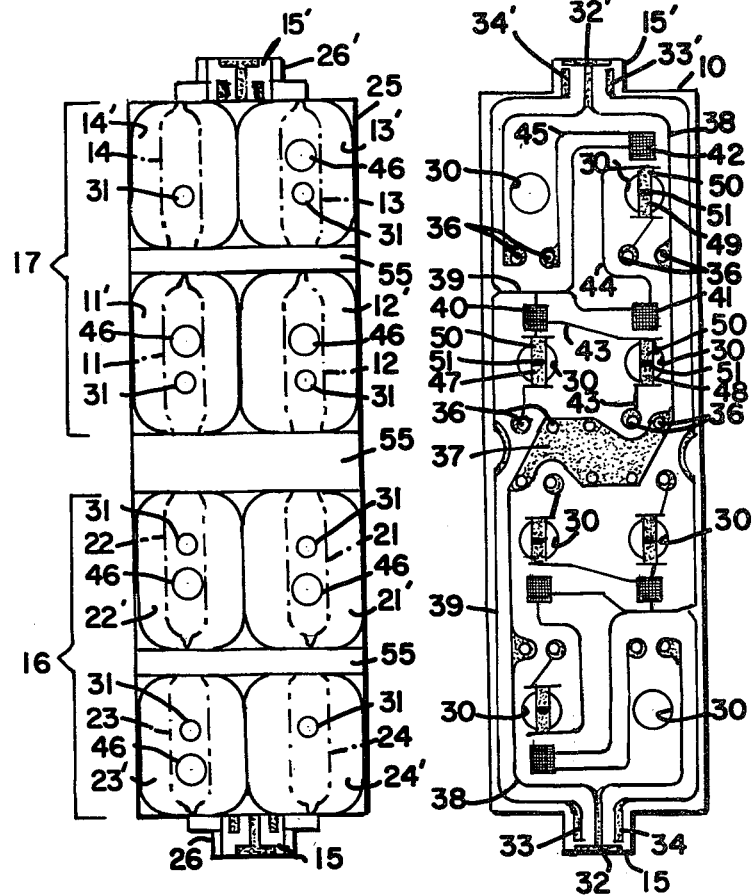

RADIATION SWITCH FOR PHOTOFLASH UNIT

BACKGROUND OF THE INVENTION

This invention relates to multilamp photoflash devices having circuit means for sequentially igniting the flashlamps and, more particularly, to improved means for permitting reliable flashing of an array of photoflash lamps.

Numerous multilamp photoflash arrangements with various types of sequencing circuits have been described in the prior art, particularly, in the past few years. Series and parallel-connected lamp array have been shown which are sequentially fired by mechanical switching means, simple electrical circuits, switching circuits using the randomly varied resistance characteristics of the lamps, arc gap arrangements, complex digital electronic switching circuits, light-sensitive switching means and heat-sensitive switching devices which involve melting, fusing or chemical reaction in response to the radiant energy output of a proximate flashed lamp. The present invention is concerned with an improved radiant-energy-activated switching means useful in a relatively inexpensive photoflash unit of the disposable type. In particular, the present switching means is particularly advantageous in photoflash arrays employing high voltage type lamps adapted to be ignited sequentially by successively applied high voltage firing pulses from a source such as a camera-shutter-actuated piezoelectric element.

A currently marketed photoflash unit of the last-mentioned type is described in U.S. Pat. No. 3,894,226 and referred to as a flip flash. The unit comprises a planar array of eight high voltage type flashlamps mounted on a printed circuit board with an array of respectively associated reflectors disposed therebetween. The lamps are arranged in two groups of four disposed on the upper and lower halves, respectively, of the rectangular shaped circuit board. A set of terminal contacts at the lower end of the unit is provided for activation of the upper group of lamps, while a set of terminal contacts at the top of the unit is operatively associated with the lower group of four lamps. The application of successive high voltage pulses (e.g., 500 to 4000 volts from, say, a piezoelectric source controlled by the shutter of a camera in which the array is inserted) to the terminal contacts at the lower end of the unit causes the four lamps at the upper half of the array to be sequentially-ignited. The array may then be turned end for end and again inserted into the camera in order to flash the remaining four lamps.

The flip flash circuit board comprises an insulating sheet of plastic having a pattern of conductive circuit traces, including the terminal contacts, on one side. The flashlamp leads are electrically connected to these circuit traces by means of eyelets secured to the circuit board and crimped to the lead wires. The circuitry on the board includes six printed, normally open, connect switches, that chemically change from a high to low resistance, so as to become electrically conducting, after exposure to the radiant heat energy from an ignited flashlamp operatively associated therewith. The purpose of these switches is to promote lamp sequencing and one-at-a-time flashing. The four lamps of each group are arranged in parallel, with three of the four lamps being connected in series with a respective thermal connect switch. Initially, only the first of the group of four lamps is connected directly to the voltage pulse source. When this first lamp flashes, it causes its associated thermal connect switch (which is series connected with the next, or second, lamp) to become permanently conductive. Because of this action, the second lamp of the group of four is connected to the pulse source. This sequence of events is repeated until all four lamps have been flashed.

One type of radiation actuated connect switch is described in U.S. Pat. No. 3,459,488 of Schroder et al, in which a paste globule containing a metal compound dissociates to form an electrical conductive bridge in response to actinic light radiation. In U.S. Pat. No. 3,458,270 of Ganser et al, the use of silver oxide in a polyvinyl binder is taught as a normally open radiant energy switch. Upon radiant heating, the silver oxide decomposes to give a metallic silver residue which is electrically conductive. More recently silver carbonate has been favored over silver oxide for this use because of its lower conductivity toward high voltage prior to thermal actuation. Some other related patents include the following: U.S. Pat. Nos. 3,598,511, 3,726,631, 3,728,067, 3,728,068, 3,692,995, 3,774,020, 3,532,931, 3,459,487, 3,668,421, 3,562,508, 3,443,875, 3,951,582, 3,969,065 and 3,969,066.

Experience has shown that upon prolonged exposure to high relative humidity and subsequent drying, that silver carbonate switches sometimes undergo chemical changes (e.g., reduction) that render such switches conductive toward high voltage. The outcome of this unintentional electrical leakage is simultaneous flashing of two or more high voltage type flashlamps within an array by a single pulse from the piezoelectric flash source. Not only is such behavior wasteful of flashlamps, but also overexposure of the picture can result. The exact nature of this reductive switch degradation, and the identity of the environmental causitive agents, have not been clearly defined.

SUMMARY OF THE INVENTION

Accordingly, it is an object of the present invention to provide a photoflash unit having improved switching means for permitting reliable flashing of an array of photoflash lamps.

A principal object of the invention is to provide an improved, normally open, radiation actuated electrical switch for use in devices such as photoflash arrays and in which the switch composition is resistant toward environmentally caused electrical leakage of high voltages.

These and other objects, advantages, and features are attained, in accordance with the invention, by incorporating an oxidizer into the silver compound radiation switch to enhance environmental stability. More specifically, I have discovered that the environmentally promoted electrical leakage in normally open silver carbonate switches can be prevented by the incorporation of an oxidizing agent, such as barium chromate, into the switch composition. The beneficial effect is believed to be attributable to destruction of the problem-causing atmospheric reducing agents by the oxidizer, thereby protecting the silver carbonate from their effects.

The oxidizing agent chosen should be such that it is reactive as an oxidizer under ambient conditions in the presence of strong reducing agents. It should also be sufficiently insoluble in water so as to not give rise to a harmful degree of electrical leakage under humid conditions. Ideally, its water solubility should be comparable to or less than that of the silver compound itself; for example, the water solubility of silver carbonate is reported to be 0.0032 grams of silver carbonate per 100 ml of water at 20° C (Handbook of Chemistry and Physics, 48th Edition, 1968; Chemical Rubber Publishing Co., Cleveland, Ohio 44128).

BRIEF DESCRIPTION OF THE DRAWINGS

This invention will be more fully described hereinafter in conjunction with the accompanying drawings, in which:

FIG. 1 is a front elevation of a multilamp photoflash unit with the array of lamps thereof shown in phantom;

FIG. 2 is a front elevation of a printed circuit board used in the array of FIG. 1, the circuit board including radiation connect switches in accordance with the invention;

FIG. 3 is a sectional schematic showing the alignment of an individual lamp of the array of FIG. 1 with respect to its reflector, circuit board switches, and flash indicator;

FIGS. 4, 5, and 6 are enlarged fragmentary detail views of portions of the circuit board of FIG. 2 respectively illustrating the physical circuit arrangements of the three connect switches on the top half thereof; and FIG. 7 is a cross-sectional view through the radiation connect switch of FIG. 5, with a dashed line coating 60 illustrating an alternative embodiment.

DESCRIPTION OF PREFERRED EMBODIMENT

FIGS. 1 and 2 illustrate portions of a multilamp photoflash unit similar to that described in the aforementioned U.S. Pat. No. 3,894,226. The unit includes a planar array of eight high voltage type flashlamps 11–14 and 21–24 mounted on a printed circuit board 10, with an array of respectively associated reflectors 11′–14′ and 21′–24′ disposed therebetween. The array is provided with a plug-in connector tab 15 at the lower end thereof which is adapted to fit into a camera or flash adapter. A second plug-in connector tab 15′ is provided at the top end of the unit, whereby the array is adapted to be attached to the camera socket in either of two orientations, i.e. with either the tab 15 or the tab 15′ plugged into the socket. The lamps are arranged in two groups of four disposed on the upper and lower halves respectively of the rectangular shaped array. Upper group 17 comprises lamps 11–14, and lower group 16 includes lamps 21–24; the reflectors 11′, etc. are disposed behind the respective lamps so that as each lamp is flashed, light is projected forwardly of the array. The lamps are arranged and connected so that when the array is connected to a camera by the connector tab 15 only the upper group 17 of lamps will be flashed, and when the array is turned end for end and connected to the camera by the other connector tab 15′, only the then upper group 16 of lamps will be flashed.

The above-mentioned components are packaged in a rectangular boxlike plastic container 25, which may comprise two pieces of plastic that are secured together. The entire container may be molded from a generally clear plastic material, or at least the window portions in the front of the flash lamps are rendered light transmitting. The window portions may also be tinted for color correction purposes. The plastic container 25 includes integral extensions 26 and 26′ at the ends thereof which partly surround and protect the connector tabs 15 and 15′ and also function to facilitate mechanical attachment to the camera socket. Sandwiched between the front and back walls of the container 25, in the order named and as generally illustrated by the schematic drawing of FIG. 3, are the flash lamps 11, etc., a reflector member (preferably of aluminum-coated plastic) shaped to provide the individual reflectors 11′ etc., the printed circuit board 10 provided with the integral connector tabs 15 and 15′, and a flash indicator assembly comprising a sheet of heat shrinkable material 27 and an indicia sheet 28, which may be provided with instructions, information, trademarks, and other indicia such as flash indicators 29 located behind the respective lamps and which change color due to heat radiation from a flashing lamp, thus indicating at a glance which of the lamps have been flashed and not flashed. If the back surfaces of the reflectors are electrically conductive, an electrically insulating sheet (not shown) may be inserted between the reflectors and conductive traces on the circuit board, as described in the aforementioned U.S. Pat. No. 3,894,226.

The indica sheet 28 may be of paper or thin cardboard and provided with openings where the flash indicators 29 are desired. The flash indicator material 27 may comprise a sheet of heat-sensitive plastic material, for example, biaxially oriented polypropylene, which shrinks or melts when subjected to heat or radiant energy from an adjacent flashing lamp, thus effectively changing the color of the openings in the indicia sheet 28. For example, the plastic material can be colored blue on its backside by ink or other suitable means, and the blue disappears and the opening becomes a different color (dark, for example) when the plastic shrinks or melts away due to heat from an adjacent flashing lamp. The front of the plastic (toward the lamps) should be coated with dark ink so as to absorb heat more readily. A single flash indicator sheet 27 may be arranged over all of the flash indicator openings. Openings, or apertures, 31 are provided through each reflector unit, and correspondingly aligned openings or apertures 30 are provided in the circuit board 10, to facilitate radiation from the flashlamps reaching the flash indicators 29. The rear panel of the container 25 is transparent (either of clear material or provided with window openings) to permit viewing of the indicia sheet 28.

The tab 15 which is integral with the circuit board 10 is provided with a pair of electrical terminals 32 and 33, and similarly the tab 15′ is provided with a pair of terminals 32′ and 33′, for contacting terminals of a camera socket for applying firing voltage pulses to the array. Each tab is provided with a third terminal 34 and 34′ respectively, which functions to electrically short the circuitry of the inactive lower group of lamps, when the array is plugged into a socket. The terminals 32 and 32′ are shown as having a lateral T-shaped configuration for temporarily shorting the socket terminals while the array is being plugged in to discharge any residual voltage which may remain in the firing pulse source and also to reduce the likelihood of lamps being accidentally flashed by electrostatic voltage when the array is handled.

The circuit board 10 has a "printed circuit" thereon, as will be described, for causing sequential flashing of the lamps by firing voltage pulses applied to terminals 32, 33 or 32′, 33′. The top and bottom halves of the printed circuitry preferably are reverse mirror images of each other. The lead wire 11a, 11b, etc., of the lamps 11, etc., (only lead wire 11a is shown in FIG. 3) may be attached to the circuit board 10 in various ways, such as by means of metal eyelets 35 (FIG. 3) placed through openings 36 (FIG. 2) in the board. The lead wires pass through openings (not shown) in the reflector member and into or through the respective pairs of eyelets, and the ends of the eyelets are crimped or bent to hold the lead wires and make electrical contact thereto and also to hold the eyelets in place with their heads in electrical contact with the circuit of the circuit board. A metal clip (not shown) is clipped onto the reflector member, which reflector is preferably made of metal-coated plastic, and the rear of the clip rests in electrical contact with an area 37 (FIG. 2) of an electrical ground circuit run 38 on the board which includes the terminals 32 and 32' and which makes contact with one of the connector eyelets for each of the lamps, whereby the reflector unit additionally functions as an electrically grounded shield.

Areas 55 on the transparent front wall of the container 25 may be made opaque or partly opaque, such as by making the surface roughened at these areas, to fully or partly conceal the lamp lead-in wires and/or the lower portions of the lamps, for improved appearance of the array.

In the case of the prior art circuit board described in the aforementioned U.S. Pat. No. 3,894,226, terminal 33 is part of a conductor run 39 that is electrically connected by means of an eyelet 35 to one of the lead-in wires of lamp 11 and terminates at the solid state, radiation connect switches 40, 41 and 42 respectively positioned near lamps 11, 12 and 13. A circuit board conductor run 43 is connected electrically to a lead wire of flash lamp 12 via an associated eyelet and terminates at the connect switch 40. A circuit board conductor run 44 is connected to a lead wire of flash lamp 13 via an eyelet and terminates at the connect switch 41. Similarly, a circuit board connector run 45 is connected to a lead wire of flash lamp 14 via an eyelet and terminates at connect switch 42. As best illustrated in FIGS. 4, 5 and 6, respectively, the radiant-energy-activated connect switches 40, 41, and 42, respectively, are in contact with and bridge across the circuit runs that are connected to them. The material for the connect switches is selected to be of a type initially having an open circuit or high resistance, the resistance thereof becoming nearly zero or a lower value when the material receives radiation in the form of heat and/or light from a respective adjacent lamp, upon the lamp being flashed. For this purpose, each of the connect switches is respectively positioned behind and near to a flashlamp 11, 12, and 13. To facilitate radiation transfer from a flashed lamp to its corresponding connect switch, each of the reflectors 11', 12' and 13' includes a second opening, or aperture, 46 in alignment respectively with the radiation connect switches 40, 41 and 42. Each of these connect switches has a composition according to the invention, as will be described hereinafter, and upon receiving heat and/or light radiation from the adjacent lamp when it is flashed, changes from an open circuit or high resistance to a closed circuit or low resistance between its switch terminals on the circuit board.

The lamp ignition circuitry further includes radiant-energy-activated quick-disconnect switches 47, 48 and 49 each electrically connected in series with a respective one of the flashlamps 11, 12 and 13. More specifically, referring to FIG. 2, the normally closed disconnect switch 47 is series connected in the circuit run 39 to lamp 11; disconnect switch 48 is series connected in the conductor run 43 between lamp 12 and the normally opened connect switch 40; and disconnect switch 49 is series connected in conductor run 44 between lamp 13 and connect switch 41. FIG. 4 more clearly illustrates the printed circuit pattern with respect to conductor run 39 and its physical relationship to switches 40 and 47. It will be noted that the run 39 actually passes straight through and beneath the patch of heat sensitive material employed in connect switch 40 in providing electrical path continuity to the element comprising disconnect switch 47. The connect switch 40 is then formed by the gap between the patch covered segment of conductor run 39 and the L-shaped terminus of conductor run 43. The physical arrangements of the connect switches 41 and 42 are shown in FIGS. 5 and 6, respectively, and are relatively straight forward.

As described in copending application Ser. No. 614,108, filed Sept. 17, 1975, now U.S. Pat. No. 4,017,728 and assigned to the present assignee, each of the quick-disconnect switches 47–49 comprises a length of electrically conductive, heat shrinkable, polymeric material which is attached to the circuit board at both ends, with its mid portion spatially suspended to avoid contact with the heat absorbing surfaces of the circuit board. This arrangement maximizes the speed with which the shrinking and separation of the mid portion of the switch element occurs upon its being heated by the radiant output of an ignited flashlamp. More specifically, referring to the embodiment illustrated in FIGS. 2, the disconnect switch comprises a thin strip 50 of plastic preferably fabricated from mono- or biaxially oriented polyethylene, polypropylene, polystyrene, polyester or nylon. The polymeric material itself may be rendered electrically conductive by additives such as carbons, or as illustrated, it may be rendered surface conductive by deposition of conductive layers thereon. Such conductive surface layers may be attained, e.g., by a vacuum metallization, electroless plating, printing, or coating using conductive inks, or by silk screening or by otherwise applying a conductive path across the switch defined by the polymeric film. The performance of highly reflective materials, such as aluminized polypropylene, can be enhanced by applying a coating or spot 51 of dark, light absorbing ink or other similar material onto the surface facing the flashlamp. The piece of switch material may be self-adhesive, such as a tape, and pressure applied to attach both ends of the strip 50 to the circuit board as illustrated. Each attached strip is located so that it bridges a respective one of the circuit board apertures 30 so as to provide a desired spatial suspension of the mid portion of the strip. For silk screened circuitry, it is advantageous to carry the circuit pattern over the ends of the preapplied switch strip. In this manner the circuit material helps to anchor the switch ends to the circuit board substrate, in addition to providing electrical connection of both ends of the switch strip into the printed circuit.

By locating the disconnect switch strips 50 across the apertures 30, each element of heat shrinkable material is positioned so as to be in operative relationship with the radiant output of its respective lamp via the reflector aperture 31. Hence, upon ignition of a given flashlamp, the switch material is radiantly heated so that it weakens and softens as well as shrinks. A separation occurs near the center of each piece, and the two severed ends shrink back away from each other so as to give an open circuit that will reliably withstand several thousand volts without leakage. Since a lamp after flashing is removed electrically from the circuit, the subsequent lamps are unaffected by short circuiting or residual conductivity in previously flashed lamps.

It will be also noted that the radiant-energy-activated flash indicators 29 are disposed on the opposite side of the circuit board from the lamps and reflectors in alignment respectively with the circuit board apertures 30 and reflector apertures 31. It will be recalled that the flash indicators are provided by a sheet of shrinkable polymeric material 27 and an overlying indicia sheet 28 having a plurality of openings providing the flash indicators 29. Accordingly, ignition of one of the flashlamps 11, 12 or 13 is operative via the resulting radiation through its respective reflector and circuit board apertures 31 and 30 to activate both the disconnect switch and flash indicator aligned therewith.

As has been explained, the lower portion of the circuit board contains a substantially reverse mirror image of the same circuit shown in the upper part of the circuit board, and therefore will not be described in detail. It will be noted that the circuit runs from the plugged in terminals 32 and 33 at the lower part of the circuit board extend upwardly so as to activate the circuitry in the upper half of the circuit board. Similarly, when the unit is turned around and tab 15' is plugged into a socket, the circuit board terminals 32' and 33' will be connected to and activate the lamps which then will be in the upper half of the circuit board, and hence in the upper half of the flash unit. This accomplishes the desirable characteristic whereby only the group of lamps relatively farthest away from the lens axis will be flashed thereby reducing the possibility of the phenomena known as "red eye".

The circuit on the circuit board 10 functions as follows. Assuming that none of the four lamps in the upper half of the unit have been flashed, upon occurrence of a first firing pulse applied across the terminals 32, 33, this pulse will be directly applied to the lead-in wires of the first connected flash lamp 11, whereupon the lamp 11 flashes and becomes an open circuit between its lead-in wires. Heat and/or light radiation from the flashing first lamp 11 is operative via its respective reflector and circuit board apertures to activate the disconnect switch 47 and the flash indicator aligned with aperture 31 of its reflector and the connect switch 40 aligned with the second aperture 46 of its reflector. As a result, the normally closed disconnect switch 47 is operative in response to the radiation from the lamp to rapidly provide a reliable open circuit to high voltages and thus electrically remove lamp 11 from the circuit, whereby the subsequent lamps 12, 13 and 14 are unaffected by short circuiting or residual conductivity in lamp 11. The radiation causes the normally open connect switch 40 to become a closed circuit (or a low value of resistance), thereby connecting the circuit board terminal 33 electrically to the lead-in wire of the second lamp 12 via the normally closed disconnect switch 48. By the time this occurs, the firing pulse has diminished to a value insufficient to cause the second lamp 12 to flash. When the next firing pulse occurs it is applied to the lead-in wires of the second lamp 12 via the now closed connect switch 40 and disconnect switch 48, whereupon the second lamp 12 flashes, thereby causing disconnect switch 48 to rapidly provide an open circuit and causing connect switch 41 to assume near zero or low resistance. When the next firing pulse occurs, it is applied via now closed connect switch 41 and disconnect switch 49 to the third lamp 13, thereby firing that lamp, whereupon the radiation from lamp 13 activates disconnect switch 49 to rapidly provide an open circuit and causes connect switch 42 to become essentially a closed circuit across its terminals. Thus, the next firing pulse will be applied, via now closed connect switch 42, to the lead-in wires of the fourth flash lamp 14, thereupon causing the lamp to flash. Since this lamp is the last lamp in the active circuit, it does not matter whether its lead-in wires are an open or closed circuit after flashing. Additional flashlamps, radiant-energy-activated switches, and electrical conductors can be employed if desired, using the just applied principle. When the flash unit is turned around and the other connector tab 15' attached to the camera or socket, the group of lamps that then become uppermost and relatively farthest away from the lens axis will be an active circuit and will be flashed in the same manner as has been described. In a preferred embodiment, the lamps 11 etc., are high voltage types requiring between about 500 and 4000 volts, for example, at low current for flashing, and they can be fired by impacting or stressing a piezoelectric element in the camera.

In accordance with the present invention, each of the solid state, radiation connect switches 40, 41 and 42 is an environmentally stabilized mass of material comprising a silver compound such as silver carbonate, a binder such as polystyrene resin, and an oxidizing agent such as barium chromate. Quite unexpectedly, the oxidizer additive has been observed to render the switch composition particularly resistant to high relative humidity at above ambient temperatures.

According to a preferred embodiment, the dried composition of a silk-screenable switch incorporating the inventive principles disclosed herein is 98.75% silver carbonate, 0.25% barium chromate, and 1.0% polystyrene resin as a binder. This mixture is made into a paste by ball milling in a suitable solvent such as butyl cellosolve acetate. The solids content may be adjusted to suit the method of switch application. For silk screening over a circuit board, I prefer to adjust the solids content to about 74%. This mixture is deposited as a mass of material across respective conductor run terminations as represented by patches 41, 42 and 43. For example, FIG. 7, without the dashed line 60, illustrates a cross-section of the switch of FIG. 5 wherein such a mixture is deposited as a mass 41 bridging conductor runs 39 and 44.

The benefits of the principle of this invention were shown in an environmental test of commerical eight-lamp flip flash arrays, such as the unit illustrated in the drawings. The control group had normally open sequencing switches containing 99% silver carbonate and 1% polystyrene in series with lamps 12, 13 and 14, and lamps 22, 23 and 24. The test group, which was otherwise identical, used the 0.25% barium chromate composition previously given. The array were placed into an environmental chamber set at 120° F and 96% relative humidity for a period of 14 days. All arrays were then removed from the chamber. Groups of these arrays were then flashed after 12-, 36-, and 54-hour periods of normalization, under ambient (room) conditions. The incidence of double flashes was recorded.

| Type | Hrs. Dry | No. Arrays | No. Lamps | Simultaneous Lamp Flashes | |
|---|---|---|---|---|---|
| | | | | No. | Percent |
| Control | 12 | 30 | 240 | 6 | 2.50 |
| Test | 12 | 30 | 240 | 0 | 0 |
| Control | 36 | 30 | 240 | 6 | 2.50 |
| Test | 36 | 30 | 240 | 0 | 0 |
| Control | 54 | 39 | 312 | 2 | 0.64 |

| Type | Hrs. Dry | No. Arrays | No. Lamps | Simultaneous Lamp Flashes | |
|------|----------|------------|-----------|------|---------|
|      |          |            |           | No.  | Percent |
| Test | 54       | 39         | 312       | 0    | 0       |

Although this testing was performed with connect switch compositions based on silver carbonate, it logically follows that a similar protective effect would be afforded to silver oxide type switches. The reason for this is that silver oxide is an intermediate stage in the decomposition of silver carbonate, it being formed after evolution of carbon dioxide. Similarly, switches using binder materials other than polystyrene resin can equally be benefited by the inventive principles taught herein. For example, other useful binders include cellulose esters, cellulose ethers, polyalkylacrylates, polyalkylmethacrylates, styrene copolymers, vinyl polymers, and polycarbonate.

Alternative materials that would be expected to function satisfactorily as the protective oxidizing agent include the following: cobaltous chromate, basic cupric chromate, lead chromate, basic lead chromate, silver dichromate, and zinc chromate. Other materials satisfying the stated requirements of reactivity as an oxidizer at normally encountered ambient conditions and sufficiently low solubility in water so as to not substantially affect the high humidity electrical conductivity of the basic silver carbonate switch composition could be used.

The application of the protective oxidizer as a thin layer over the silver compound switch would also be expected to be functional, as an alternative to direct incorporation into the switch. For example, referring to FIG. 7, if mass 41 were a mixture of silver carbonate and polystyrene resin, the barium chromate could be applied as a thin film protective coating 60 over the mixture 41.

The percentage of oxidizer in the final dried composition may be from 0.01 percent to about 20 percent by weight. At very low levels the protective effect diminishes, whereas at higher percentages the conductivity of the switch after activation suffers. I prefer to use from about 0.02 percent to 2.0 percent, and find that from 0.1 percent to 0.25 percent is sufficient.

Accordingly, although the invention has been described with respect to specific embodiments, it will be appreciated that modifications and changes may be made by those skilled in the art without departing from the true spirit and scope of the invention.

What I claim is:

1. A multilamp photoflash unit comprising, in combination,
    a pair of flashlamps,
    an electrical circuit into which said lamps are arranged to fire individually and in sequence, and
    a solid state radiation switch located external of the lamps and forming part of said electrical circuit, said switch being located adjacent one of said flashlamps to receive radiant energy emitted by that flashlamp, said photoflash unit being characterized by said switch being a high relative humidity and temperature resistant mass of material comprising silver carbonate and/or silver oxide, a binder and a chromate salt having a water solubility which is about equal to or less than the water solubility of said silver carbonate and/or silver oxide.

2. The photoflash unit of claim 1 wherein said mass of switch material comprises a mixture of said silver carbonate and/or silver oxide, said binder and said chromate salt.

3. The photoflash unit of claim 1 wherein said mass of switch material comprises a mixture of said silver carbonate and/or silver oxide and binder with a protective coating of said chromate salt over said mixture.

4. The photoflash unit of claim 1 wherein the proportion by weight of said chromate salt in the dried composition of said mass of switch material is from about 0.01 percent to 20 percent.

5. The photoflash unit of claim 1 wherein the proportion by weight of said chromate salt in the dried composition of said mass of switch material is from about 0.02 percent to 2.0 percent.

6. The photoflash unit of claim 1 wherein said binder is polystyrene resin, and the proportion of chromate salt in the dried composition of said mass of switch material is from about 0.1 percent to 0.25 percent.

7. The photoflash unit of claim 6 wherein said chromate salt is barium chromate.

8. The photoflash unit of claim 1 wherein said chromate salt is a member selected from the group consisting of barium chromate, cobaltous chromate, basic cupric chromate, lead chromate, basic lead chromate, silver chromate, and zinc chromate.

* * * * *